US012176617B2

(12) United States Patent
Miyagawa

(10) Patent No.: US 12,176,617 B2
(45) Date of Patent: Dec. 24, 2024

(54) ANTENNA DEVICE AND RADAR APPARATUS

(71) Applicant: FURUNO ELECTRIC CO., LTD., Hyogo (JP)

(72) Inventor: Tetsuya Miyagawa, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 328 days.

(21) Appl. No.: 17/662,967

(22) Filed: May 11, 2022

(65) Prior Publication Data

US 2022/0271436 A1 Aug. 25, 2022

Related U.S. Application Data

(63) Continuation of application No. PCT/JP2020/038911, filed on Oct. 15, 2020.

(30) Foreign Application Priority Data

Nov. 12, 2019 (JP) ................................ 2019-204650

(51) Int. Cl.

| | |
|---|---|
| ***H01Q 5/371*** | (2015.01) |
| ***H01Q 1/24*** | (2006.01) |
| ***H01Q 9/06*** | (2006.01) |
| ***H01Q 21/00*** | (2006.01) |

(52) U.S. Cl.

CPC ......... *H01Q 21/0075* (2013.01); *H01Q 1/247* (2013.01); *H01Q 5/371* (2015.01); *H01Q 9/065* (2013.01)

(58) Field of Classification Search

CPC .... H01Q 21/0075; H01Q 5/371; H01Q 1/247; H01Q 9/065

See application file for complete search history.

(56) References Cited

U.S. PATENT DOCUMENTS

2010/0225528 A1* 9/2010 Shijo .................. G01S 13/4463 342/368

FOREIGN PATENT DOCUMENTS

| | | | | |
|---|---|---|---|---|
| JP | 2001-111336 A | | 4/2001 | |
| JP | 2005340939 A | * | 12/2005 | ......... H01Q 21/0006 |
| JP | 2007053656 A | * | 3/2007 | |
| JP | 2010-212895 A | | 9/2010 | |

OTHER PUBLICATIONS

International Search Report issued in PCT/JP2020/038911; mailed Dec. 22, 2020.

* cited by examiner

*Primary Examiner* — Henry Luong

(74) *Attorney, Agent, or Firm* — Studebaker & Brackett PC

(57) ABSTRACT

The present disclosure improves an antenna characteristic related to high-frequency radio waves. An antenna device includes a first line antenna which includes a straight first feeder line, and a plurality of first antenna elements, each connected at an end to the first feeder line and extending perpendicularly from the first feeder line, and a second line antenna which includes a second feeder line and a plurality of second antenna elements that are line symmetry from the first line antenna with respect to an imaginary line parallel to the first feeder line as an axis of symmetry.

15 Claims, 18 Drawing Sheets

ANTENNA DEVICE AND RADAR APPARATUS

CROSS-REFERENCE TO RELATED APPLICATION(S)

This application is a continuation of PCT International Application No. PCT/JP2020/038911, which was filed on Oct. 15, 2020, and which claims priority to Japanese Patent Application Ser. No. 2019-204650 filed on Nov. 12, 2019, the entire disclosures of each of which are herein incorporated by reference for all purposes.

TECHNICAL FIELD

The present disclosure relates to an antenna device and a radar apparatus.

BACKGROUND

For example, JP2007-053656A (Patent Document 1) discloses the following microstrip array antenna. That is, the microstrip array antenna is comprised of a dielectric substrate where a conductive earth plate is formed on the back side, and a strip conductor formed on the dielectric substrate. The strip conductor is comprised of a power feed strip line disposed linearly, and a plurality of rectangular radiation antenna elements which are connected to and disposed at at least one of side edges of the power feed strip line, at a given interval along the side edge(s). Each radiation antenna element has a rectangular shape of which the length differs from the width, and it is connected so that the longitudinal direction becomes about 90° to the power feed strip line, and one power feed strip line has two or more power feed strip lines with different widths thereon, by using at least one or more line width conversion structure. [Reference Document of Conventional Art]

[Patent Document]

[Patent Document 1] JP2007-053656A

SUMMARY

[Problem to be Solved by the Disclosure]

When high-frequency radio wave is propagated through an antenna, the gain fall by the propagating loss of the power feeder line, and the characteristic degradation resulting from unnecessary emission and reflection, may increase. Therefore, technologies for improving the antenna characteristics related to high-frequency radio waves are desired.

The present disclosure is made in order to solve the problem described above, and one purpose thereof is to provide an antenna device and a radar apparatus, capable of improving an antenna characteristic related to high-frequency radio waves.

Means for Solving the Problem

In order to solve the problem, an antenna device according to one aspect of the present disclosure includes a first line antenna which includes a straight first feeder line, and a plurality of first antenna elements, each connected at an end to the first feeder line and extending perpendicularly from the first feeder line, and a second line antenna which includes a second feeder line and a plurality of second antenna elements that are line symmetry from the first line antenna with respect to an imaginary line parallel to the first feeder line as an axis of symmetry.

In additional antenna device embodiments, the antenna device further includes a distributer which reverses phases of current fed to the first line antenna and the second line antenna from each other, wherein phases of current fed to the first line antenna and the second line antenna are reversed from each other. The plurality of first antenna elements are connected to the same side of the first feeder line, and the plurality of second antenna elements are connected to the same side of the second feeder line. The plurality of first antenna elements and the plurality of second antenna elements extend toward the axis of symmetry.

In yet another aspect, the present disclosure provides a radar apparatus. The radar apparatus includes a first line antenna which includes a straight first feeder line, and a plurality of first antenna elements, each connected at an end to the first feeder line and extending perpendicularly from the first feeder line, and a second line antenna which includes a second feeder line and a plurality of second antenna elements that are line symmetry from the first line antenna with respect to an imaginary line parallel to the first feeder line as an axis of symmetry, a transceiver which communicates a radio wave using the antenna device.

According to this configuration of connecting the ends of the antenna elements to the feeder line, the loss due to branching of current can be suppressed. Further, in the line antennas arrayed in the width direction of the feeder line, when reversing the phases of the radio waves given to the two line antennas, or when reversing the phases of the radio waves propagated from the corresponding two line antennas by the configuration of mutually reversing the direction of the corresponding antenna elements, the polarization in the unnecessary direction can be weakened in the corresponding antenna elements, while strengthening the polarization in the necessary direction, thereby suppressing the side lobes etc. Therefore, the antenna characteristics related to the high-frequency radio wave can be improved.

According to the present disclosure, the antenna characteristic related to the high-frequency radio waves can be improved.

DETAILED DESCRIPTION

Figure 1:
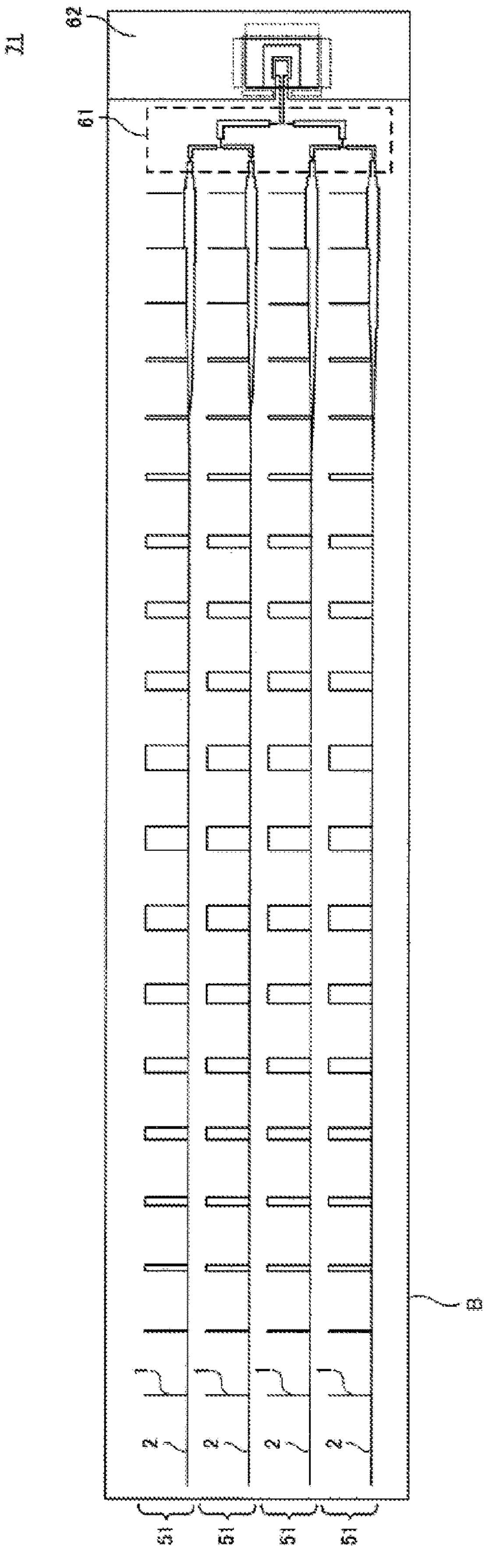
FIG. 1 is a view illustrating a configuration of Comparative Example 1 of an antenna device according to one embodiment of the present disclosure.

Hereinafter, one embodiment of the present disclosure is described using the drawings. Note that the same reference characters are given to the same or corresponding parts in the drawings not to repeat the explanation.

Further, at least parts of the embodiment described below may be combined arbitrarily.

[Conventional Art 1]

FIG. 1 is a view illustrating a configuration of Comparative Example 1 of an antenna device according to this embodiment of the present disclosure.

Referring to FIG. 1, an antenna device 71 includes a plurality of line antennas 51, a branching part 61, and a feed part 62. The line antenna 51 includes a plurality of antenna elements 1 and a straight feeder line 2.

For example, an antenna device 71 is used for a radar apparatus in a ship, such as a fishing boat. For example, the antenna device 71 performs at least one of transmission and reception of high-frequency radio waves, such as a millimeter wave. An emitting direction R in which the antenna device 71 should emit the radio wave is, for example, a direction penetrating the drawing sheet of FIG. 1, and upward from the drawing sheet.

The line antennas 51 are arrayed in the width direction of the feeder line 2. Each line antenna 51 is realized by using a microstrip line formed in a substrate B, for example.

The line antenna 51 is a comb-line antenna. In more detail, in the line antenna 51, the antenna elements 1 are connected so that they are lined up in the extending direction of the feeder line 2.

The antenna element 1 has, for example, a rectangular shape, and has a first end part which is opened, and a second end part connected to the feeder line 2. That is, the line antenna 51 is in-series feed type antenna. Each antenna element 1 is connected to one side of the feeder line 2.

The line antennas 51 each includes the same number of antenna elements 1. Between the line antennas 51, the corresponding antenna elements 1 oppose to each other in the width direction of the feeder line 2. In the line antenna 51, the plurality of antenna elements 1 extend in the same direction.

For example, the adjacent line antennas 51 are disposed so that a center-to-center distance of the antenna elements 1 in the width direction of the feeder line 2 becomes equal.

The feed part 62 feeds electric power to each line antenna 51 via the branching part 61. For example, the feed part 62 is provided with a waveguide-microstrip line converter which electromagnetically couples the feeder line 2 which is a microstrip line to a waveguide (not illustrated). This converter is of a proximity power feed type in which the microstrip line is connected with the waveguide via the substrate, for example.

The branching part 61 branches AC current fed from the feed part 62, and feeds it to each line antenna 51.

Since the antenna device 71 adopted the in-series feed type line antenna 51 in which the antenna elements 1 are directly coupled to the feeder line 2, it can suppress loss due to the branching of current, compared with a parallel feed type in which branching parts to the antenna element 1 occur from the feeder line 2.

Figure 2:
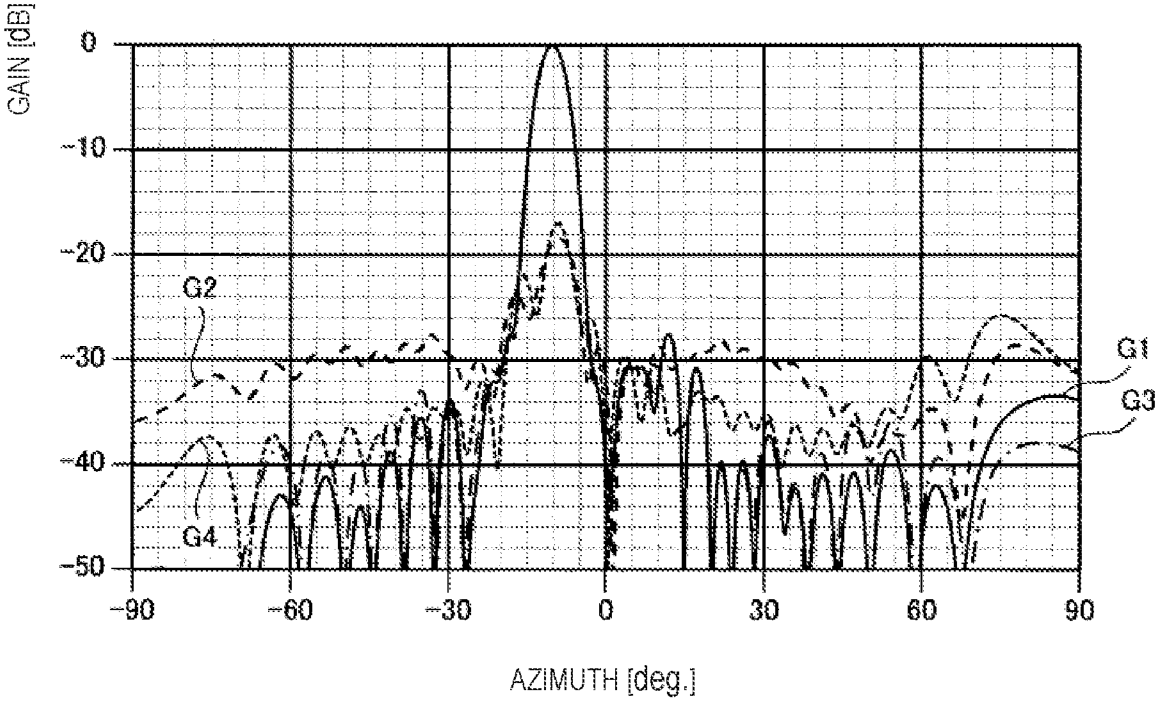
FIG. 2 is a view illustrating a simulation result of horizontal plane directivity of Comparative Example 1 of the antenna device according to this embodiment of the present disclosure.

FIG. 2 is a view illustrating a simulation result of horizontal plane directivity of Comparative Example 1 of the antenna device according to this embodiment of the present disclosure.

In FIG. 2, the vertical axis indicates a gain [dB] and the horizontal axis indicates a bearing or an azimuth [degree]. In FIG. 2, graphs G1 and G2 indicate the directivities of the vertical polarization and the horizontal polarization of the antenna device 71 provided with the converter, respectively, and graphs G3 and G4 indicate the directivities of the vertical polarization and the horizontal polarization of the antenna device 71 without the converter being provided, respectively. Further, 0° bearing corresponds to the center of the emitting direction R, and plus or minus 90° bearing corresponds to the extending direction of the feeder line 2.

Referring to FIG. 2, the graphs G2 and G4 indicate that, in the antenna device 71, side lobes of the horizontal polarization become larger, and the side lobes are entirely larger when the converter is provided.

Thus, in the antenna device 71, since the proximity power feed type is adopted, unnecessary emission from the waveguide-microstrip line converter is large, and therefore, the side lobes of horizontal polarizations are deteriorated.

[Conventional Art 2]

Figure 3:
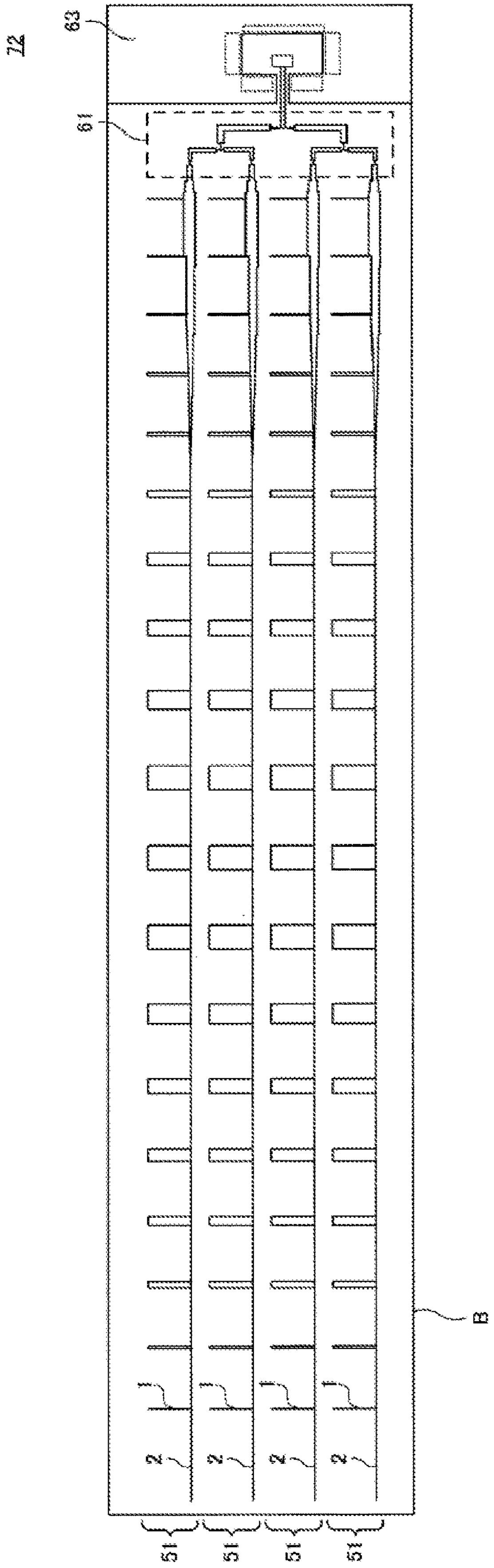
FIG. 3 is a view illustrating a configuration of Comparative Example 2 of the antenna device according to this embodiment of the present disclosure.

Next, Comparative Example 2 of the antenna device is described. It is similar to Comparative Example 1, other than those described below. FIG. 3 is a view illustrating a configuration of Comparative Example 2 of the antenna device according to this embodiment of the present disclosure.

Referring to FIG. 3, an antenna device 72 is provided with a feed part 63 instead of the feed part 62, compared with the antenna device 71.

The feed part 63 feeds electric power to each line antenna 51 via the branching part 61. The feed part 63 includes a waveguide-microstrip line converter which electromagnetically couples the feeder line 2 which is a microstrip line to a waveguide (not illustrated), for example.

This converter is a back short type in which a short-circuit part of the microstrip line is disposed at a position which is separated by ¼ of the effective wavelength from a short-circuit part of the waveguide, and it converts a transmission mode between the waveguide and the microstrip line, for example. This converter includes a grounding part which forms the short-circuit part of dielectric waveguide. The grounding part is realized by a metal casing, for example.

By adopting the back short type, since the short-circuit part of the microstrip line can be disposed at a position where the signal intensity becomes the maximum, the conversion efficiency of the signal transmission mode can be improved.

Figure 4:
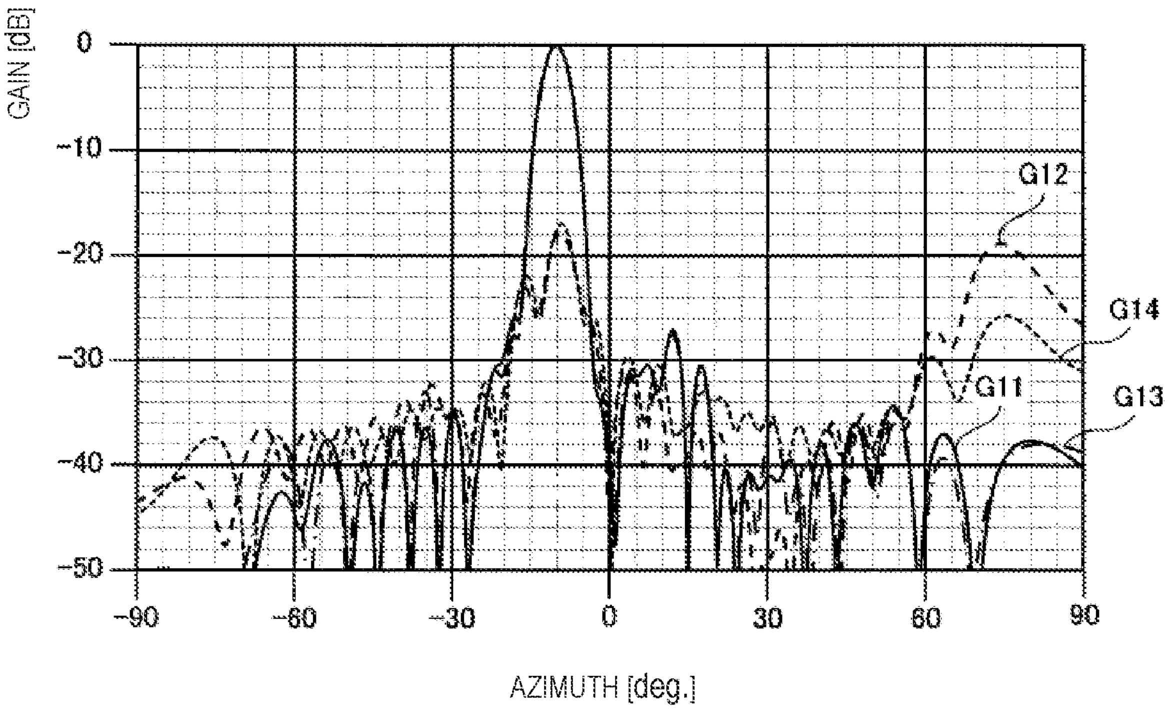
FIG. 4 is a view illustrating a simulation result of horizontal plane directivity of Comparative Example 2 of the antenna device according to this embodiment of the present disclosure.

FIG. 4 is a view illustrating a simulation result of horizontal plane directivity of Comparative Example 2 of the antenna device according to this embodiment of the present disclosure. In FIG. 4, graphs G11 and G12 are the directivities of the vertical polarization and the horizontal polarization of the antenna device 72 provided with the converter, respectively, and graphs G13 and G14 are the directivities of the vertical polarization and the horizontal polarization of the antenna device 72 without the converter being provided, respectively. The view is similar to FIG. 2.

Referring to FIG. 4, in the antenna device 72, the metal casing etc. can protect the unnecessary emission from the converter.

Meanwhile, from the graphs G12 and G14, it can be seen that the horizontal polarization in a direction toward a terminal part of the feeder line 2 (i.e., 90° bearing) is strengthened by the reflection at the metal casing, the side lobes of the horizontal polarization becomes larger, and the side lobes are larger when the converter is provided.

Thus, similar to the antenna device 71, the problem in which the side lobes of the horizontal polarization are deteriorated occurs in the antenna device 72.

Figure 5:
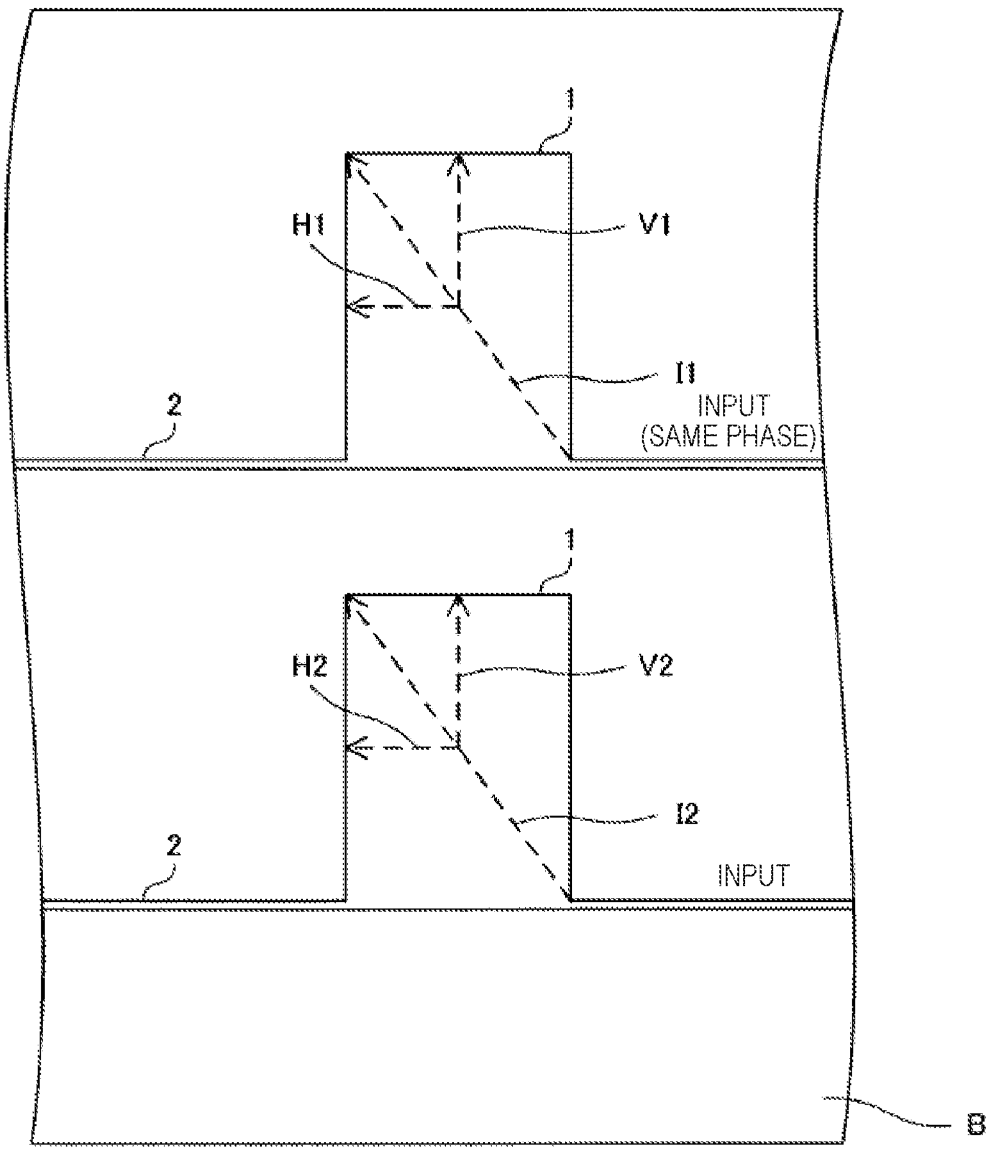
FIG. 5 is a view illustrating the reason why the horizontal polarization occurs in Comparative Example 1 and Comparative Example 2 of the antenna device according to this embodiment of the present disclosure.

FIG. 5 is a view illustrating the reason why the horizontal polarization occurs in Comparative Example 1 and Comparative Example 2 of the antenna device according to this embodiment of the present disclosure.

Referring to FIG. 5, in the line antenna 51, since current flows to the antenna element 1 obliquely from the feeder line 2, the vertical polarization and the horizontal polarization occur. Further, as for the antenna elements 1 which oppose to each other between the line antennas 51, since directions of current I1 and I2 are the same at a certain timing, vertical polarizations V1 and V2 occurred at the line antennas 51 are strengthened by each other, and horizontal polarizations H1 and H2 are strengthened by the line antennas 51. That is, the side lobes of the horizontal polarization by the line antennas 51 are strengthened by each other.

[Conventional Art 3]

Next, Comparative Example 3 of the antenna device is described. It is similar to Comparative Example 1, other than those described below.

Figure 6:
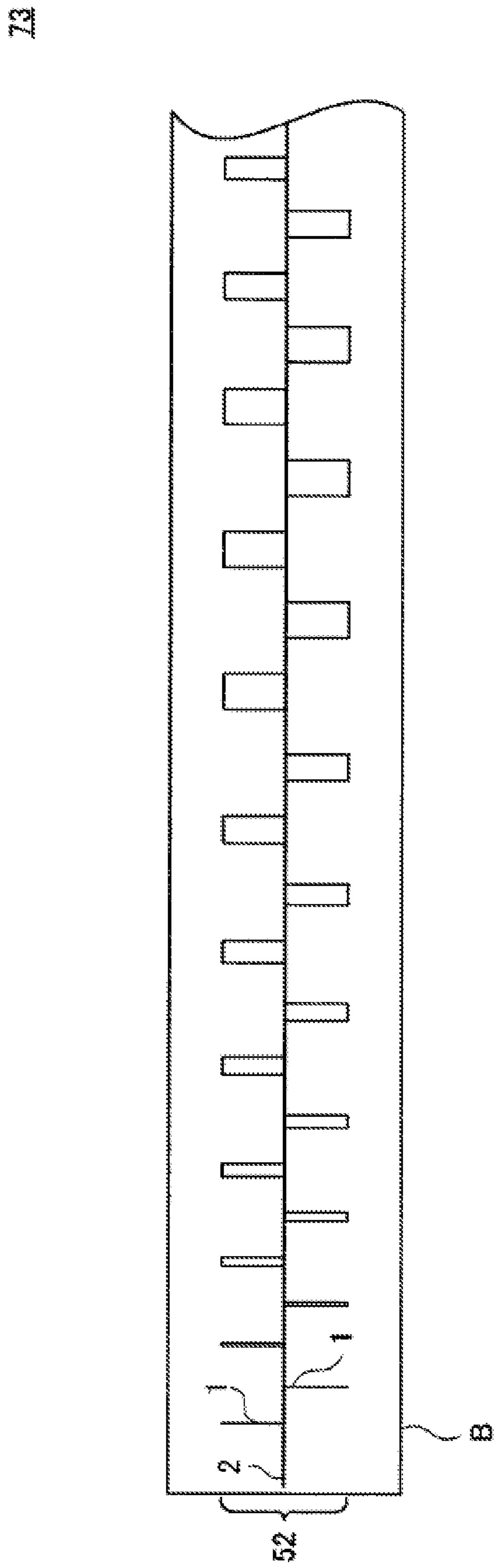
FIG. 6 is a view illustrating a configuration of a line antenna in Comparative Example 3 of the antenna device according to this embodiment of the present disclosure.

FIG. 6 is a view illustrating a configuration of a line antenna in Comparative Example 3 of the antenna device according to this embodiment of the present disclosure.

Referring to FIG. 6, an antenna device 73 is provided with a line antenna 52 instead of the line antennas 51, compared with the antenna device 71.

The line antenna 52 is a comb-line antenna. In more detail, in the line antenna 52, the antenna elements 1 are lined up in the extending direction of the straight feeder line 2, and alternately connected to both sides of the feeder line 2.

Figure 7:
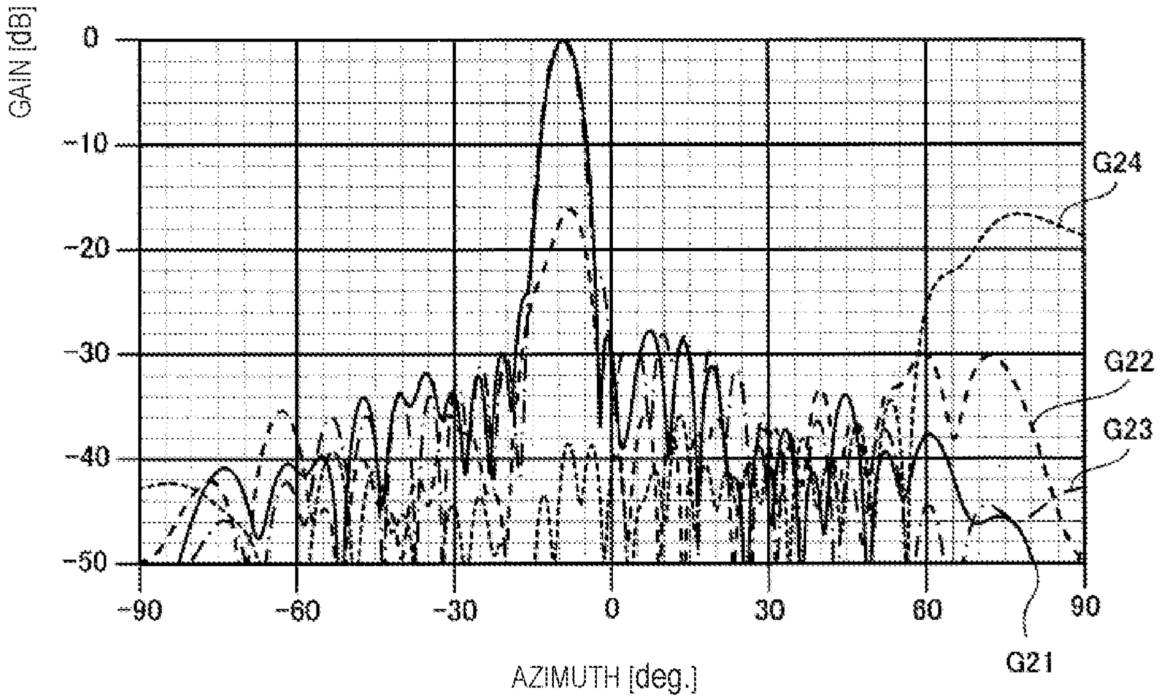
FIG. 7 is a view illustrating a simulation result of horizontal plane directivity of Comparative Example 3 of the antenna device according to this embodiment of the present disclosure.

FIG. 7 is a view illustrating a simulation result of horizontal plane directivity of Comparative Example 3 of the antenna device according to this embodiment of the present disclosure. In FIG. 7, graphs G21 and G22 are the directivities of the vertical polarization and the horizontal polarization of the antenna device in which the antenna elements 1 are connected to one side of the feeder line 2 similar to the antenna devices 71 and 72, respectively, and graphs G23 and G24 are the directivities of the vertical polarization and the horizontal polarization of the antenna device 73, respectively. The view is similar to FIG. 2.

Figure 8:
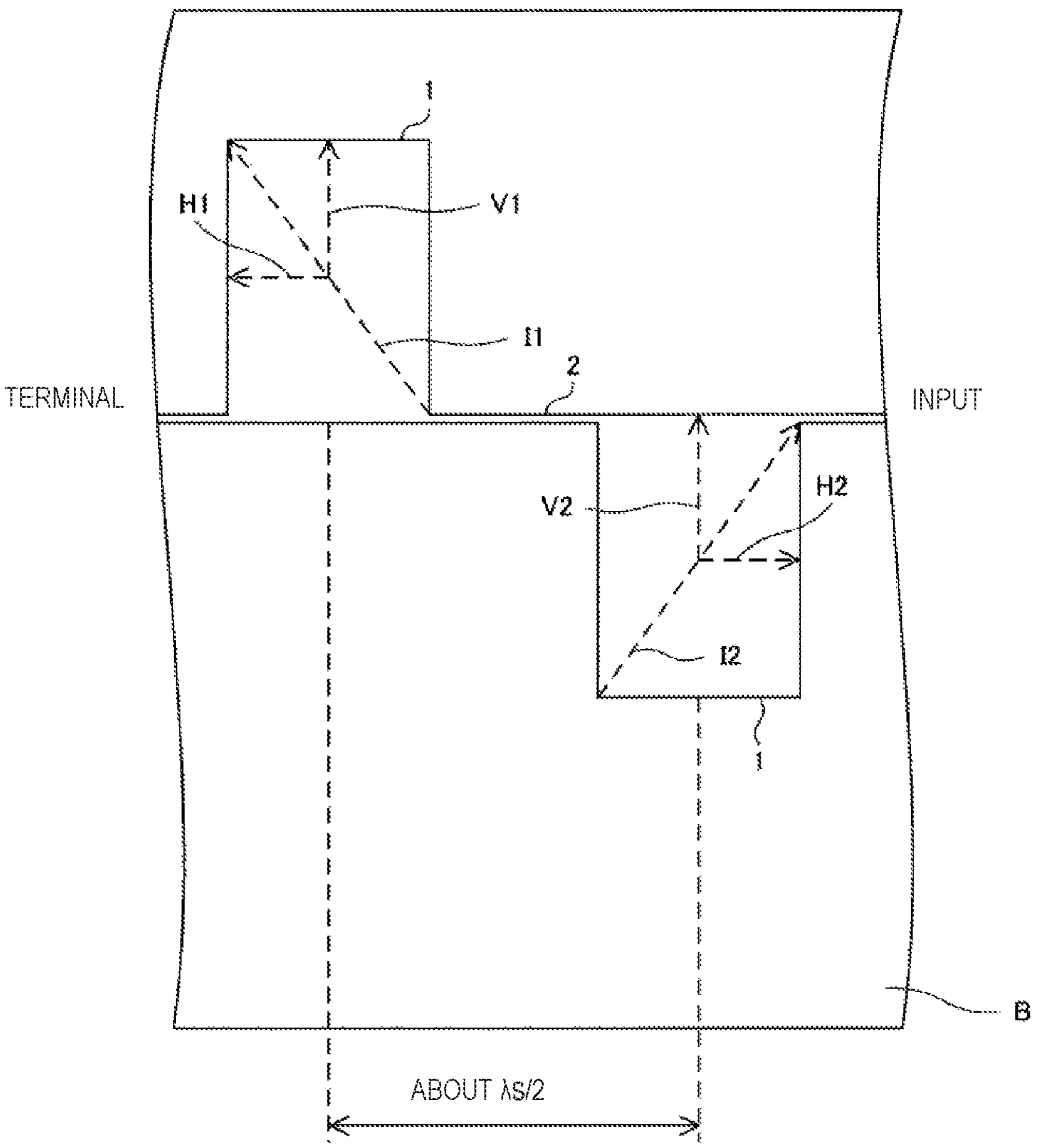
FIG. 8 is a view illustrating the reason why the horizontal polarization occurs in Comparative Example 3 of the antenna device according to this embodiment of the present disclosure.

FIG. 8 is a view illustrating the reason why the horizontal polarization occurs in Comparative Example 3 of the antenna device according to this embodiment of the present disclosure.

Referring to FIGS. 7 and 8, in the line antenna 52, the interval of the antenna elements 1 which are adjacent to each other in the extending direction of the feeder line 2 on both sides of the feeder line 2 is about ½ of the wavelength λs of the radio wave which propagates the substrate B which forms the line antenna 52. Therefore, since current I1 and I2 with the opposite phases are fed to the adjacent antenna elements 1, the horizontal polarizations are canceled out each other in the emitting direction R.

Meanwhile, in the direction toward the terminal part of the feeder line 2, since the interval of the antenna elements 1 is about λ s/2, while the radio wave is propagated to the next antenna element 1, the phase rotates 180° and becomes in the same phase, thereby the horizontal polarizations are strengthened by each other.

Therefore, the graphs G22 and G24 indicate that, in the antenna device 73, the side lobes of the horizontal polarization become larger in the direction toward the terminal part of the feeder line 2.

Thus, also in the antenna device 73, the problem in which the side lobes of the horizontal polarization are deteriorated occurs, similar to the antenna devices 71 and 72.

Thus, the antenna device according to this embodiment of the present disclosure solves the above problem with the following configuration.

Embodiment

Figure 9:
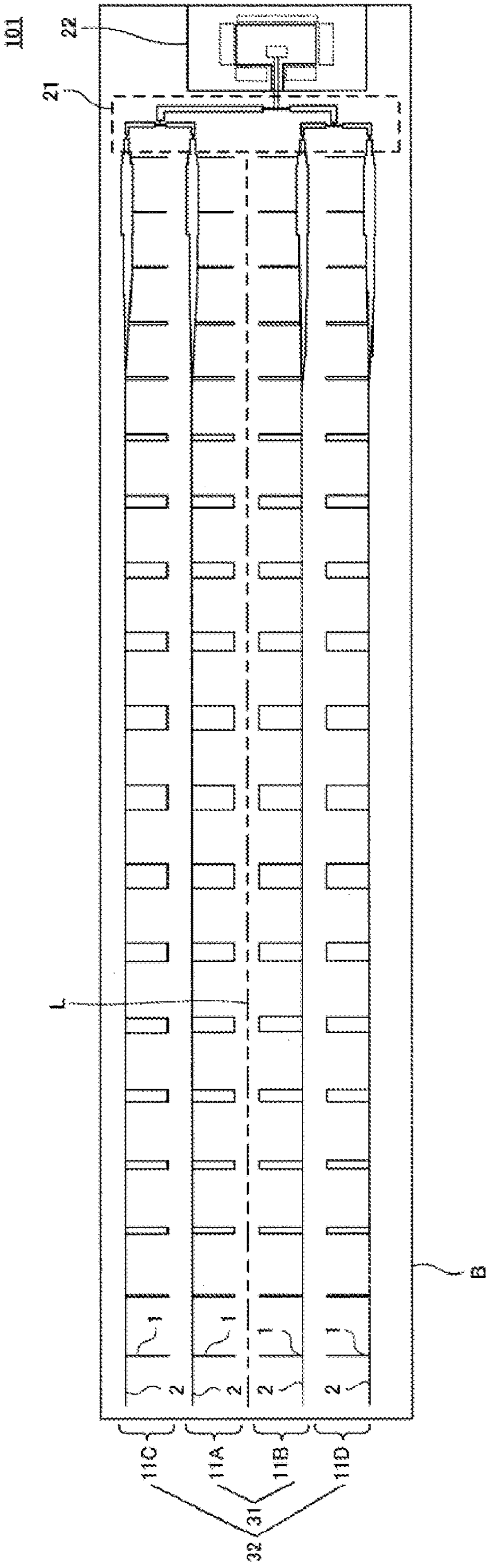
FIG. 9 is a view illustrating a configuration of the antenna device according to this embodiment of the present disclosure.

FIG. 9 is a view illustrating a configuration of the antenna device according to this embodiment of the present disclosure.

Referring to FIG. 9, the antenna device 101 may include one or more antenna groups, a distributor 21, and a feed part 22. Each antenna group may be comprised of two line antennas 11. That is, each antenna group may include two line antennas 11.

In the example illustrated in FIG. 9, the antenna device 101 may include two antenna groups 31 and 32. The antenna group 31 may include line antennas 11A and 11B which are the line antennas 11. The antenna group 32 may include line antennas 11C and 11D which are the line antennas 11. Each line antenna 11 may include a plurality of antenna elements 1 and a straight feeder line 2.

That is, the antenna device 101 may have a two-dimensional array configuration in which the line antennas 11 are disposed in even number of rows.

The two antenna groups may be lined up in the width direction of the feeder line 2. Further, one of the antenna groups may sandwich the other antenna group.

The antenna device 101 may be used for a radar apparatus in a ship, such as a fishing boat, for example. The antenna device 101 may perform at least one of transmission and reception of high-frequency radio waves, such as the millimeter wave, for example. The emitting direction R in which the antenna device 101 should emit the radio wave may be a direction penetrating the drawing sheet of FIG. 1 and a direction upward from the drawing sheet, for example.

The line antennas 11 may be lined up in the width direction of the feeder line 2. Each line antenna 11 may be realized by using a microstrip line formed on the substrate B, for example.

The line antenna 11 may be a comb-line antenna. In more detail, in the line antenna 11, each antenna element 1 may be connected so that they are lined up in the extending direction of the feeder line 2. Each antenna element 1 may extend perpendicularly from the feeder line 2.

The antenna element 1 has, for example, a rectangular shape, and has a first end part opened and a second end part connected to the feeder line 2. That is, the line antenna 11 may be in-series feed type antenna. Each antenna element 1 of the line antenna 11 may be connected to one side of the feeder line 2 (that is, all the antenna elements 1 may be connected to the same side of the feeder line 2).

Note that the shape of the antenna element 1 may be other shapes, without being limited to the rectangular shape. That is, the line antenna 11 may have any configuration as long as it is the in-series feed type in which an end of each antenna element 1 is connected to the feeder line 2.

In the antenna group, each line antenna 11 may include the same number of antenna elements 1. The corresponding antenna elements 1 of the line antennas 11 may oppose to each other in the width direction of the feeder line 2. The extending directions of the corresponding antenna elements 1 of the line antennas 11 may be reversed from each other. That is, two line antennas 11 which constitute one antenna group may be provided at positions of line symmetry to the center axis in the extending direction of the feeder line 2 of the antenna group. In detail, the feeder line 2 and a plurality of antenna elements 1 in one of two line antennas 11 which constitute one antenna group may be line symmetry from the other line antenna 11 by using an imaginary line L parallel to the feeder line 2 as the axis of symmetry.

Further, for example, in two line antennas 11 which constitute one antenna group, each antenna element 1 may extend toward the other line antenna 11 (i.e., toward the imaginary line L).

For example, in adjacent line antennas 11, each line antenna 11 may be disposed so that a center-to-center distance of the antenna elements 1 in the width direction of the feeder line 2 becomes equal.

The feed part 22 may feed electric power to each line antenna 11 via the distributor 21. The feed part 22 may include a waveguide-microstrip line converter of the back short type, for example, similar to the feed part 63 of Comparative Example 2. Note that the feed part 22 may include a waveguide-microstrip line converter of a proximity power feed type.

In the antenna device 101, since the in-series feed type line antenna 11 which directly couples the antenna elements 1 and the feeder line 2 is adopted, loss due to the branching of current can be suppressed compared with the parallel feed type in which the branching part from the feeder line 2 to the antenna element 1 occurs.

Figure 10:
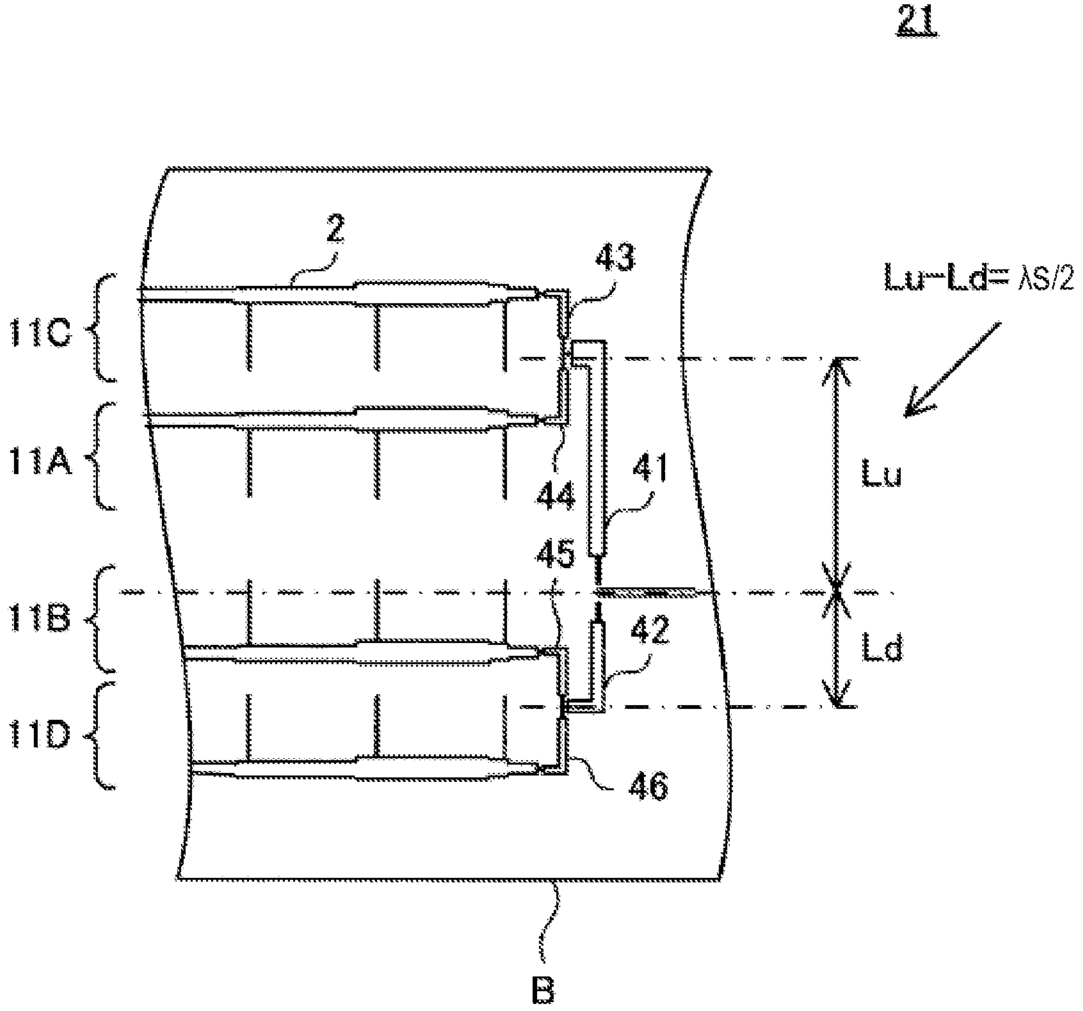
FIG. 10 is a view illustrating a configuration of a distributor in the antenna device according to this embodiment of the present disclosure.

FIG. 10 is a view illustrating a configuration of the distributor in the antenna device according to this embodiment of the present disclosure.

Referring to FIG. 10, the antenna device 101 may be provided with a phase shifter which mutually reverses the phases of current fed to two line antennas 11 which constitute one antenna group, for example. That is, the phase shifter may mutually reverse the phases of radio waves given to two line antennas 11 which constitute one antenna group, or mutually reverse the phases of radio waves propagated from two line antennas 11 which constitute one antenna group.

The phase shifter may be realized by the distributor 21. In more detail, the distributor 21 may have lines 41-46. AC current from the feed part 22 may be branched and fed to the line 41, and further branched and fed to the lines 43 and 44 which are connected to the line antennas 11C and 11A, respectively. AC current from the feed part 22 may be branched and fed to the line 42, and further branched and fed to the lines 45 and 46 which are connected to the line antennas 11B and 11D, respectively.

In the distributor 21, when the length of the line 41 is Lu, and the length of the line 42 is Ld, the lengths of the lines 41 and 42 are set so that Lu-Ld=$\lambda$ s/2 may be satisfied. Further, the lengths of the lines 43-46 may be set so as to become equal.

Therefore, the phases of AC current fed to the two corresponding line antennas 11 in each of the antenna groups 31 and 32 can be reversed mutually.

That is, in each of the antenna groups 31 and 32, the phases of the radio waves given to the two corresponding line antennas can be reversed mutually, or the phases of the radio waves propagated from the two line antennas can be reversed mutually.

Note that the antenna device 101 is not limited to be provided with the phase shifter, but the phase shifter may be provided in a transceiver which is connected to the feed part 22 via the waveguide.

Figure 11:
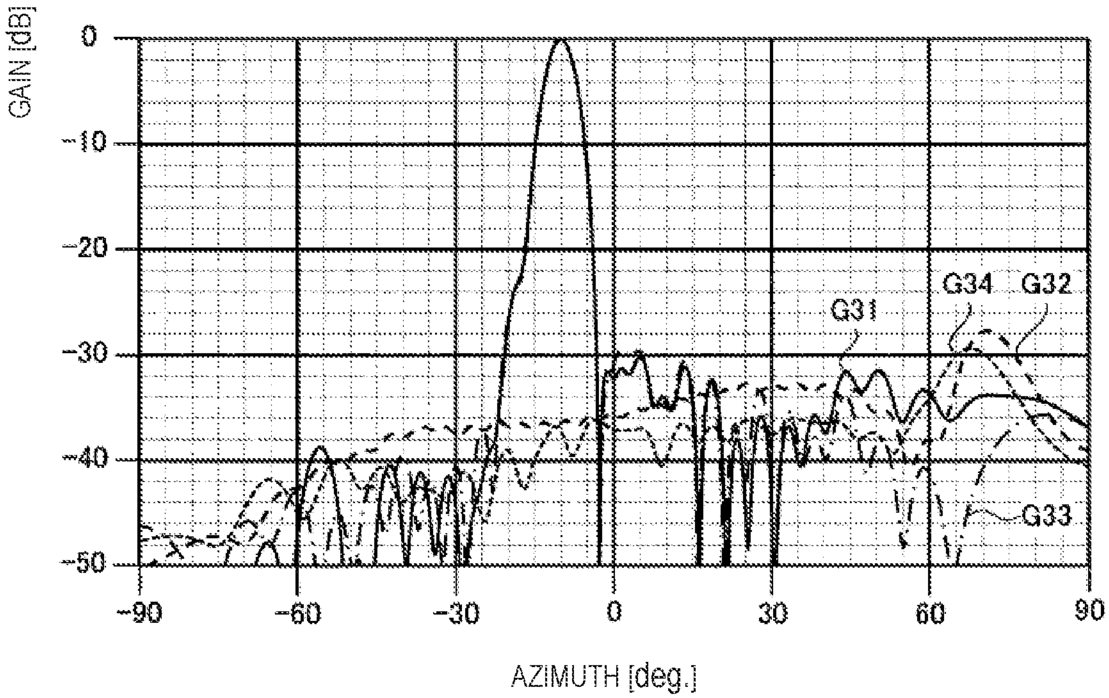
FIG. 11 is a view illustrating a simulation result of horizontal plane directivity of the antenna device according to this embodiment of the present disclosure.

FIG. 11 is a view illustrating a simulation result of horizontal plane directivity of the antenna device according to this embodiment of the present disclosure. In FIG. 11, graphs G31 and G32 are the directivities of the vertical polarization and the horizontal polarization of the antenna device 101 provided with the converter, respectively, and graphs G33 and G34 are the directivities of the vertical polarization and the horizontal polarization of the antenna device 101 without the converter being provided, respectively. The view is similar to FIG. 2.

Figure 12:
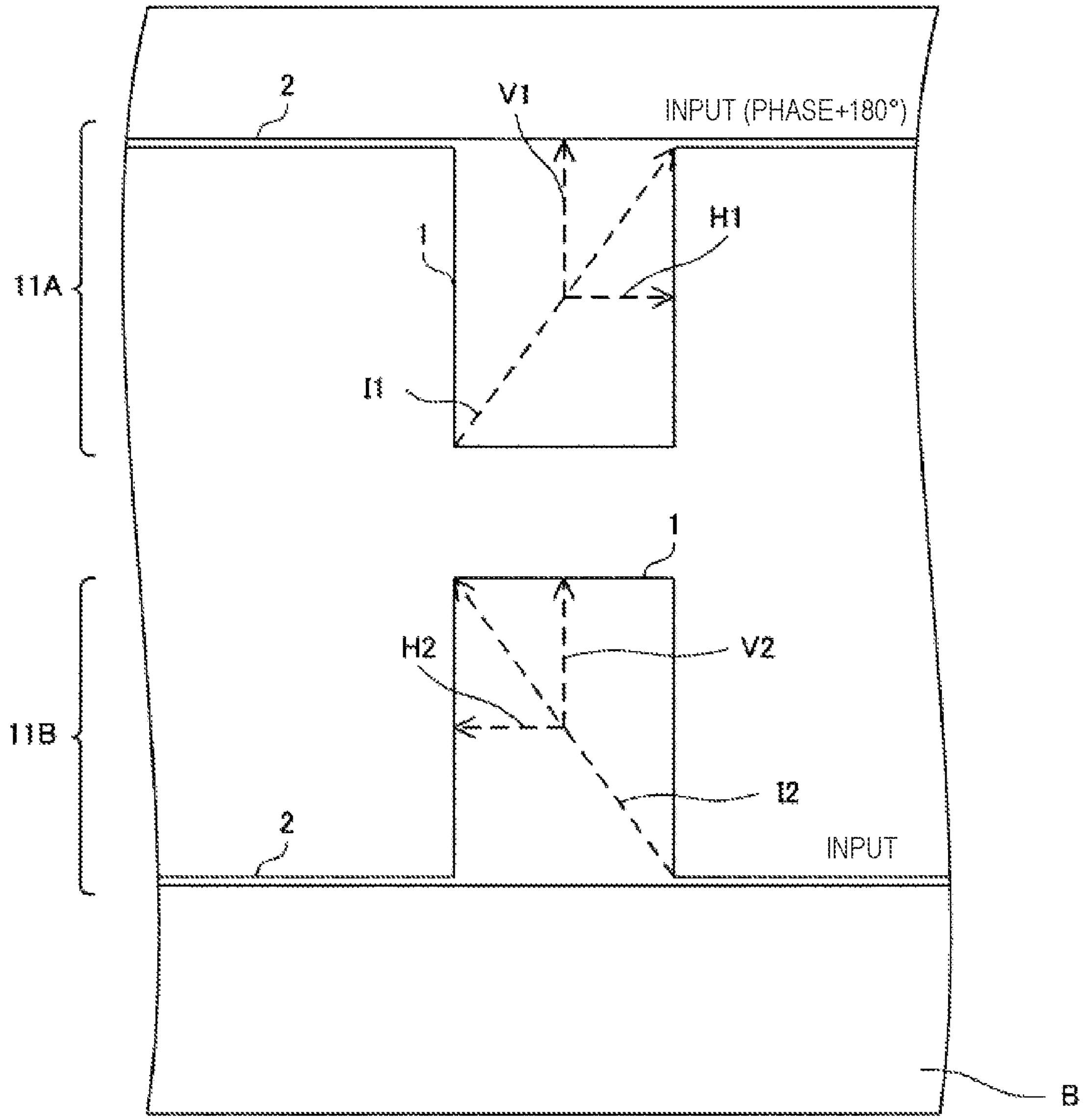
FIG. 12 is a view illustrating the reason why the horizontal polarizations are canceled out each other in the antenna device according to this embodiment of the present disclosure.

FIG. 12 is a view illustrating the reason why the horizontal polarization waves are canceled out each other in the antenna device according to this embodiment of the present disclosure.

Referring to FIGS. 11 and 12, in the line antenna 11, similar to Comparative Examples 1-3, since current flows to the antenna element 1 obliquely from the feeder line 2, the vertical polarization and the horizontal polarization may occur.

Meanwhile, in the antenna device 101, by the distributor 21, AC current with 180° different phases may be fed to the two line antennas 11 in the antenna group, and the extending directions of the corresponding antenna elements 1 of the line antennas 11 may be reversed from each other.

According to such a configuration, in two line antennas which constitute one antenna group (for example, the line antennas 11A and 11B), the directions of current I1 and I2, for example, at a certain timing become an obliquely rightward and upward direction, and an obliquely leftward upward direction in the drawing sheet of FIG. 12, respectively. Thus, the vertical polarizations V1 and V2 caused by the line antennas 11A and 11B may be strengthened by each other, and the horizontal polarizations H1 and H2 caused by the line antennas 11A and 11B may be canceled out each other.

Therefore, in the antenna device 101, the side lobes of the horizontal polarization can be suppressed, while strengthening the vertical polarization by the two line antennas which constitute one antenna group, thereby realizing antenna characteristics also suitable in a high frequency range.

In detail, it can be seen from the graph G34 that the side lobes of the horizontal polarization in the direction toward the terminal part of the feeder line 2 (i.e., at 90° bearing) are suppressed compared with the characteristics of the antenna device 72 illustrated, for example, in the graph G14 of FIG. 4. Further, it can be seen from the graph G32 that, even when the converter is provided, the side lobes of the horizontal polarization described above are suppressed compared with the characteristics of the antenna device 72 illustrated, for example, in the graph G12 of FIG. 4.

Further, according to the configuration using the two antenna groups 31 and 32, as illustrated in FIG. 11, a beam width of the main lobe can be set to about 20° to about 30°. Note that, in order to make the beam sharper, the antenna device 101 may be configured to be provided with more number of antenna groups.

[Modifications]

Next, modifications of the antenna device are described. It is similar to the antenna device 101 described above, other than those described below.

Figure 13:
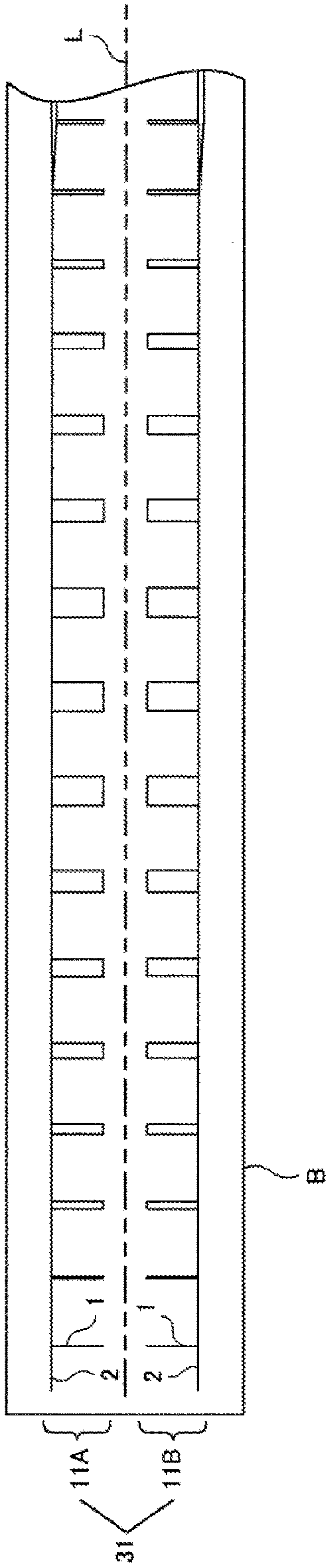
FIG. 13 is a view illustrating a configuration of Modification 1 of the antenna device according to this embodiment of the present disclosure.

FIG. 13 is a view illustrating a configuration of Modification 1 of the antenna device according to this embodiment of the present disclosure.

Referring to FIG. 13, the antenna device 101 may be provided with one antenna group.

Figure 14:
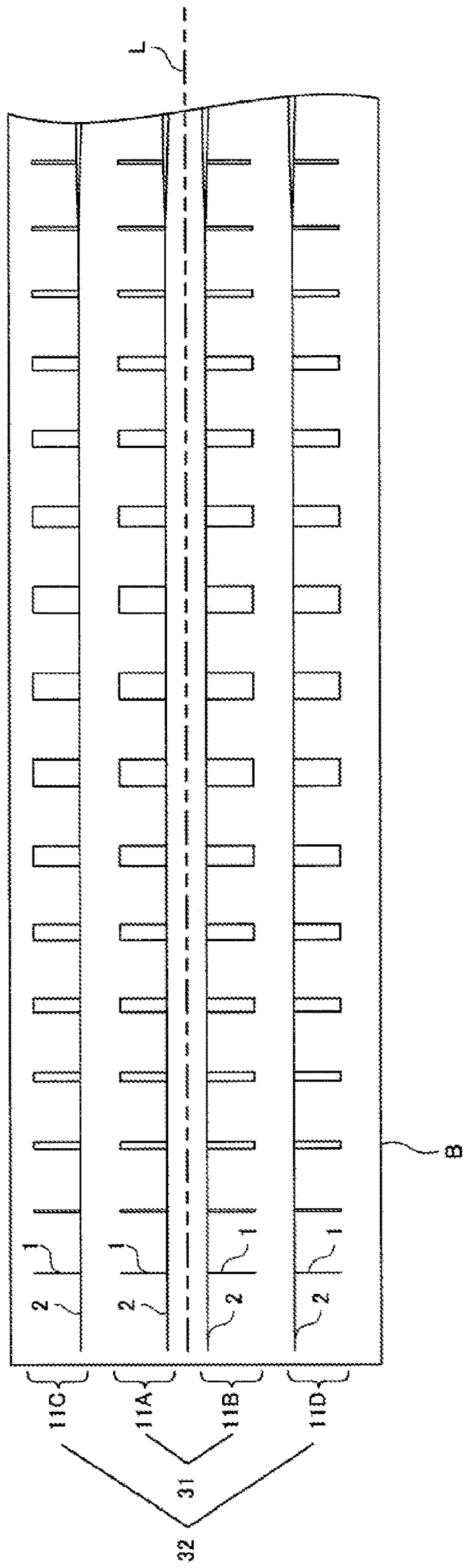
FIG. 14 is a view illustrating a configuration of Modification 2 of the antenna device according to this embodiment of the present disclosure.

FIG. 14 is a view illustrating a configuration of Modification 2 of the antenna device according to this embodiment of the present disclosure.

Referring to FIG. 14, in the antenna device 101, the antenna elements 1 of two line antennas 11 which constitute one antenna group may extend to the opposite side from the other line antenna 51 (i.e., from the imaginary line L).

Figure 15:
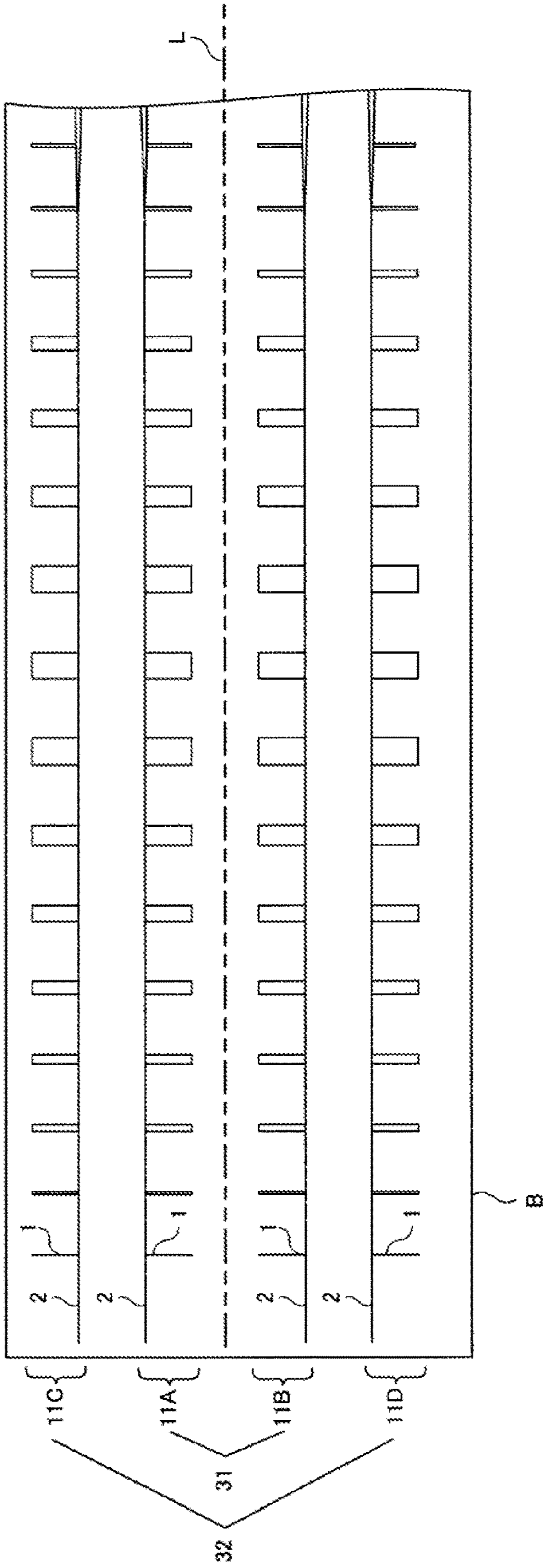
FIG. 15 is a view illustrating a configuration of Modification 3 of the antenna device according to this embodiment of the present disclosure.

FIG. 15 is a view illustrating a configuration of Modification 3 of the antenna device according to this embodiment of the present disclosure.

Referring to FIG. 15, the antenna device 101 may be comprised of an antenna group in which antenna elements 1 of two line antennas 51 extend toward the other line antenna 51 (i.e., toward the imaginary line L), and an antenna group in which antenna elements 1 of two line antennas 51 extend toward the opposite side from the other line antenna 51 (i.e., from the imaginary line L).

Figure 16:
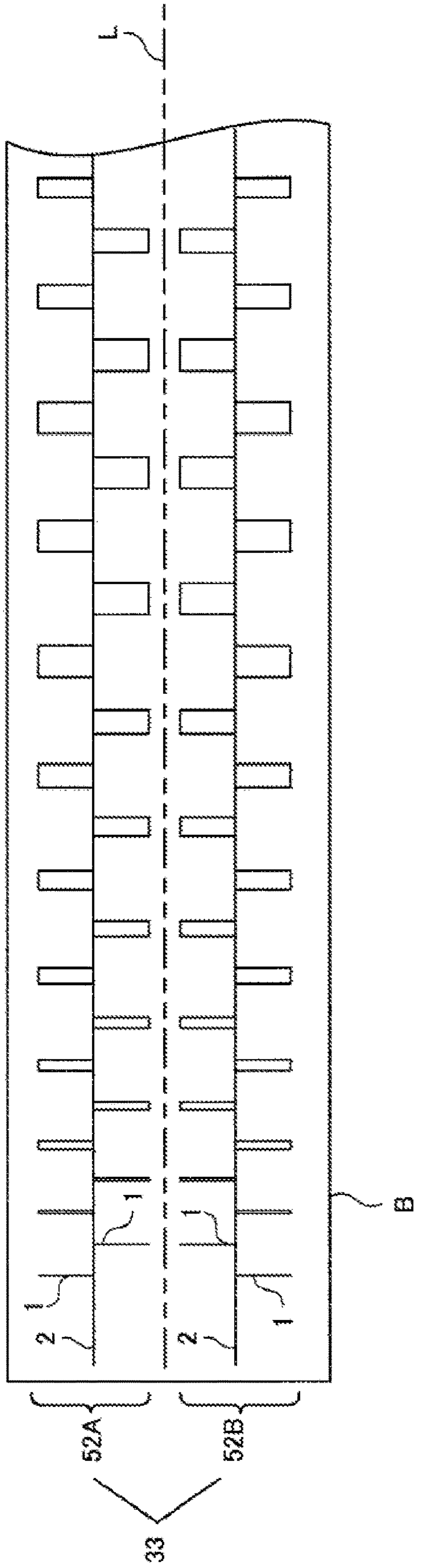
FIG. 16 is a view illustrating a configuration of Modification 4 of the antenna device according to this embodiment of the present disclosure.

FIG. 16 is a view illustrating a configuration of Modification 4 of the antenna device according to this embodiment of the present disclosure.

Referring to FIG. 16, the antenna device 101 may be comprised of one or more antenna groups which include two line antennas 52 similar to Comparative Example 3.

In the example illustrated in FIG. 16, the antenna device 101 may be provided with one antenna group 33.

The antenna group 33 may include line antennas 52A and 52B which are line antennas 52. The line antennas 52A and 52B may include the same number of antenna elements 1 mutually. Between the line antennas 52A and 52B, the corresponding antenna elements 1 may oppose to each other in the width direction of the feeder line 2. Between the line antenna 52A and 52B, the extending directions of the corresponding antenna elements 1 may be mutually reversed.

Figure 17:
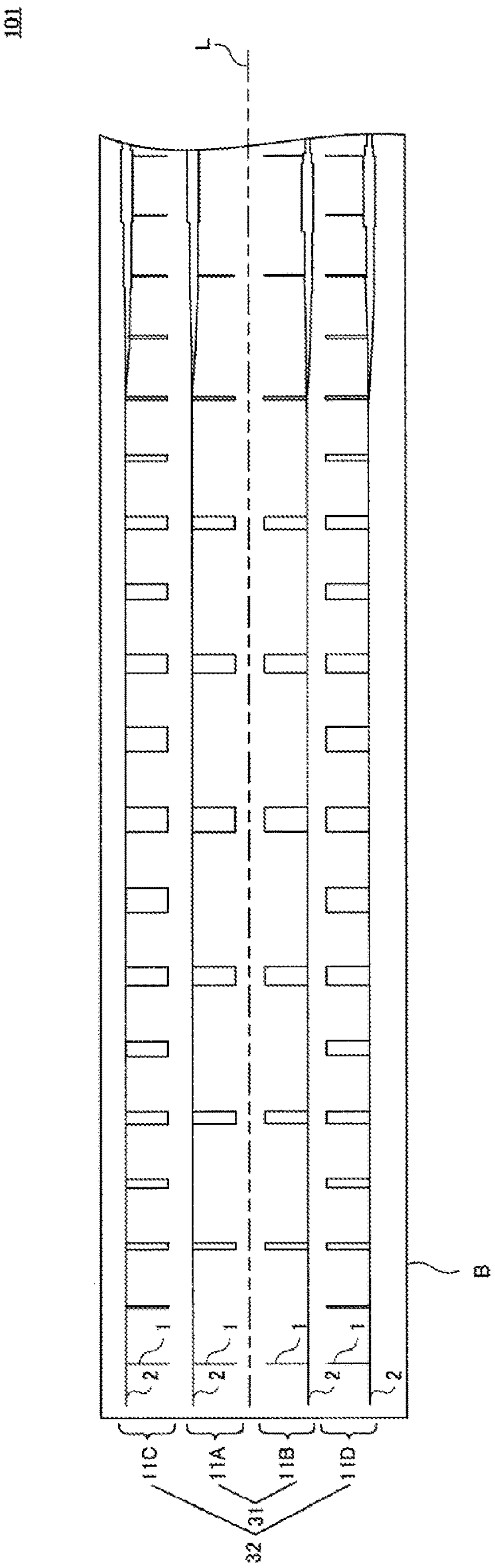
FIG. 17 is a view illustrating a configuration of Modification 5 of the antenna device according to this embodiment of the present disclosure.

FIG. 17 is a view illustrating a configuration of Modification 5 of the antenna device according to this embodiment of the present disclosure.

Referring to FIG. 17, the antenna device 101 may be configured so that the number of antenna elements 1 in the line antenna 11 differs between different antenna groups.

[Radar Apparatus]

Figure 18:
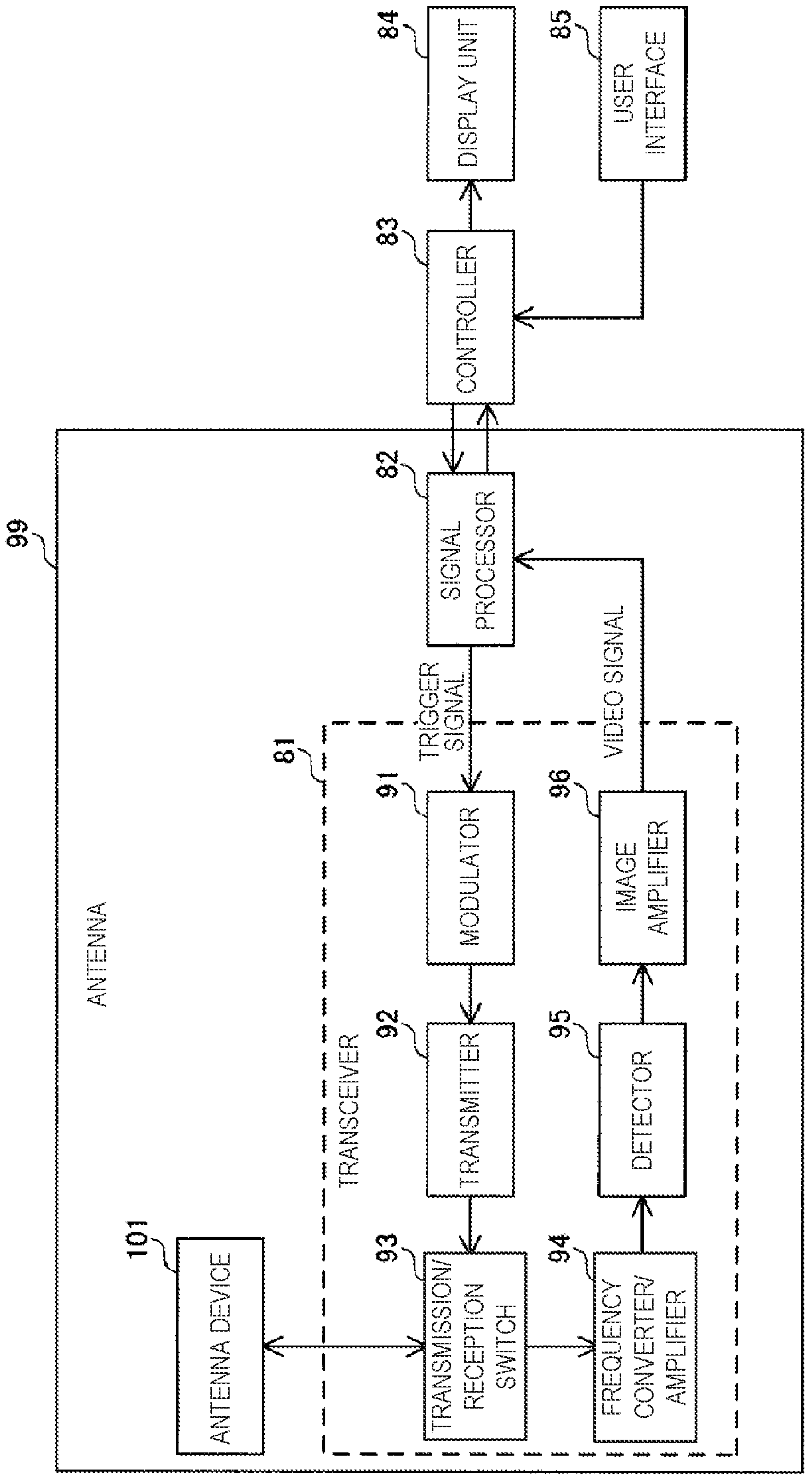
FIG. 18 is a view illustrating one example of a configuration of a radar apparatus which is one example of application of the antenna device according to this embodiment of the present disclosure.

FIG. 18 is a view illustrating one example of a configuration of a radar apparatus which is one example of application of the antenna device according to this embodiment of the present disclosure.

Referring to FIG. 18, a radar apparatus 201 is used, for example, for a ship such as a fishing boat, and may include an antenna 99, a controller 83, a display unit 84, and a user interface 85. The antenna 99 may include an antenna device 101, a transceiver 81, and a signal processor 82. The transceiver 81 may include a modulator 91, a transmitter 92, a transmission-and-reception switch 93, a frequency converter/amplifier 94, a detector 95, and an image amplifier 96.

The antenna 99 may include an actuator (not illustrated) which rotates the antenna device 101. The transceiver 81 of the antenna 99 may communicate a radio wave by using the antenna device 101.

In more detail, the controller 83 may control each component of the radar apparatus 201 in response to a reception from the user interface 85 of operational information indicative of user's operation accepted by the user interface 85.

The signal processor 82 may output a trigger signal to the modulator 91 in accordance with a control of the controller 83.

The modulator 91 may create pulse voltage in response to the trigger signal from the signal processor 82, and output it to the transmitter 92.

The transmitter 92 may generate a radio wave according to the pulse voltage received from the modulator 91, and output it to the antenna device 101 via the transmission-and-reception switch 93 and the waveguide (not illustrated).

The antenna device 101 may emit the radio wave received from the transmitter 92. Further, the antenna device 101 may receive a reflection wave which is caused by the emitted radio wave being reflected on a target object, and output it to the frequency converter/amplifier 94 via the waveguide (not illustrated) and the transmission-and-reception switch 93.

The frequency converter/amplifier 94 may down-convert and amplify the radio wave received from the antenna device 101, and output the amplified signal to the detector 95.

The detector 95 may generate a video signal by detecting the signal received from the frequency converter/amplifier 94, and output it to the image amplifier 96.

The image amplifier 96 may amplify the video signal received from the detector 95, and output it to the signal processor 82.

The signal processor 82 may carry out given signal processing to the video signal received from the image amplifier 96, and output the signal-processed digital signal to the controller 83.

The controller 83 may convert the digital signal received from the signal processor 82 into video information, and output it to the display unit 84 along with video information of other apparatuses, such as a sensor connected to the radar apparatus 201.

The display unit 84 may display the video information received from the controller 83 (i.e., a radar image and information on various sensors) on a screen.

Note that the antenna device 101 may be used for a device which only transmits the radio wave, or may be used for a device which only receives the radio wave.

Meanwhile, when propagating the high-frequency radio wave in the antenna, the gain fall due to the propagation loss of the feeder line, and the characteristic degradation resulting from the unnecessary emission and reflection may increase. The technology which can improve the antenna characteristics related to the high-frequency radio wave is desired.

In this regard, in the antenna device according to this embodiment of the present disclosure, two line antennas 11 which constitute one antenna group each may include the straight feeder line 2, and the plurality of antenna elements 1 in which one end of each antenna element 1 is connected to the feeder line 2 and extends perpendicularly from the feeder line 2. The feeder line 2 and the plurality of antenna elements 1 in one of the two line antennas 11 may be line symmetry of the other line antenna 11 with respect to the imaginary line L parallel to the feeder line 2 as the axis of symmetry.

The radar apparatus according to this embodiment of the present disclosure may be provided with the antenna device 101, and the transceiver 81 which transmits and receives the radio wave by using the antenna device 101.

Thus, according to the configuration of connecting the ends of the antenna elements to the feeder line, the loss due to the branching of current can be suppressed. Further, according to the configuration of the two line antennas being line symmetry, when reversing the phases of the radio waves given to the two line antennas, or when reversing the phases of the radio waves propagated from the corresponding two line antennas, the polarization in the unnecessary direction can be weakened in the corresponding antenna elements, while strengthening the polarization in the necessary direction, thereby suppressing the side lobes etc.

Therefore, in the antenna device and the radar apparatus according to this embodiment of the present disclosure, the antenna characteristics related to the high-frequency radio wave can be improved.

Further, in the antenna device according to this embodiment of the present disclosure, the phases of the current fed to the two line antennas which constitute one antenna group may be reversed from each other.

According to such a configuration, in the antenna device, between the two line antennas, the phases of the radio waves in the specific direction can be reversed from each other with the simple configuration.

Moreover, in the antenna device according to this embodiment of the present disclosure, the distributor 21 may mutually reverse the phases of current fed to the two line antennas 11 which constitute one antenna group.

According to such a configuration, the function of the phase shifter can be implemented efficiently utilizing the distributor.

Further, in the antenna device according to this embodiment of the present disclosure, the antenna elements 1 of the line antenna 11 may be connected to the same side of the feeder line 2.

According to such a configuration, since the size of the antenna device in the width direction of the feeder line can be reduced, the grating lobe can be suppressed, thereby improving the antenna characteristics.

Further, in the antenna device according to this embodiment of the present disclosure, in the two line antennas 11 which constitute one antenna group, the antenna elements 1 may extend toward the imaginary line L.

According to such a configuration, for example, in two line antennas of an antenna group located at the center side in the width direction of the feeder line, since the antenna elements can be disposed in the space between the feeder lines which are provided in order to avoid interference between the feeder lines, the size of the antenna device in the width direction of the feeder line can further be reduced, and, for example, the grating lobe can further be suppressed.

Further, in the antenna device according to this embodiment of the present disclosure, two antenna groups may be provided, and one of the antenna groups may be provided so as to sandwich the other antenna group.

According to such a configuration, a more suitable beam width can be realized.

Further, in the antenna device according to this embodiment of the present disclosure, the feed part 22 may include the waveguide-microstrip line converter of the back short type, and feed electric power to each feeder line 2.

According to such a configuration, in the antenna device in which the side lobes tend to be larger due to the reflection of the radio wave on the metal casing which constitutes the grounding part, the side lobes can be suppressed, thereby improving the antenna characteristics.

The embodiment described above is illustration in all aspects, and should not to be considered as restrictive. The scope of the present disclosure is illustrated by not the above description but the claims, and it is intended to include all changes and modifications within the meaning and the scope of the equivalents of the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms) Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane. As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature. It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Antenna Element
2 Feeder Line
11A, 11B, 11C, 11D, 51, 52, 52A, 52B Line Antenna
21 Distributor
22, 62, 63 Feed Part
31, 32, 33 Antenna Group
41-46 Line
61 Branching Part
81 Transceiver
82 Signal Processor
83 Controller
84 Display Unit
85 User Interface
91 Modulator

92 Transmitter
93 Transmission-and-reception Switch
94 Frequency Converter/Amplifier
95 Detector
96 Image Amplifier
99 Antenna
71, 72, 73, 101 Antenna Device
201 Radar Apparatus

What is claimed is:

1. An antenna device, comprising:
a first line antenna, including:
a straight first feeder line; and
a plurality of first antenna elements, each connected at an end to the first feeder line and extending perpendicularly from the first feeder line;
a second line antenna, including: a second feeder line and a plurality of second antenna elements that are line symmetry from the first line antenna with respect to an imaginary line parallel to the first feeder line as an axis of symmetry; and
a feeder, including a waveguide-microstrip line converter of a back short type, which is configured to feed electric power to the first feeder line and the second feeder line.

2. The antenna device of claim 1, wherein phases of current fed to the first line antenna and the second line antenna are reversed from each other.

3. The antenna device of claim 2, further comprising a distributor that reverses phases of current fed to the first line antenna and the second line antenna from each other.

4. The antenna device of claim 1, wherein the plurality of first antenna elements are connected to the same side of the first feeder line, and the plurality of second antenna elements are connected to the same side of the second feeder line.

5. The antenna device of claim 1, wherein the plurality of first antenna elements and the plurality of second antenna elements extend toward the axis of symmetry.

6. The antenna device of claim 4, wherein the plurality of first antenna elements and the plurality of second antenna elements extend toward the axis of symmetry.

7. The antenna device of claim 1, wherein two antenna groups are provided, each antenna group comprised of the first line antenna and the second line antenna, and
wherein one of the antenna groups is arranged to sandwich the other antenna group.

8. The antenna device of claim 4, wherein two antenna groups are provided, each antenna group comprised of the first line antenna and the second line antenna, and
wherein one of the antenna groups is arranged to sandwich the other antenna group.

9. The antenna device of claim 5, wherein two antenna groups are provided, each antenna group comprised of the first line antenna and the second line antenna, and
wherein one of the antenna groups is arranged to sandwich the other antenna group.

10. A radar apparatus, comprising:
the antenna device of claim 1; and
a transceiver that communicates a radio wave using the antenna device.

11. A radar apparatus, comprising:
the antenna device of claim 4; and
a transceiver that communicates a radio wave using the antenna device.

12. A radar apparatus, comprising:
the antenna device of claim 5; and
a transceiver that communicates a radio wave using the antenna device.

13. A radar apparatus, comprising:
the antenna device of claim 7; and
a transceiver that communicates a radio wave using the antenna device.

14. A radar apparatus, comprising:
the antenna device of claim 8; and
a transceiver that communicates a radio wave using the antenna device.

15. A radar apparatus of claim 10, further comprising a signal processor configured to:
carry out given signal processing to the video signal; and
output the signal-processed digital signal.

* * * * *